Jan. 3, 1928.
L. BLACKMORE ET AL
1,655,129
AUTOMOBILE SHIPPING DEVICE
Filed June 13, 1924
2 Sheets-Sheet 1
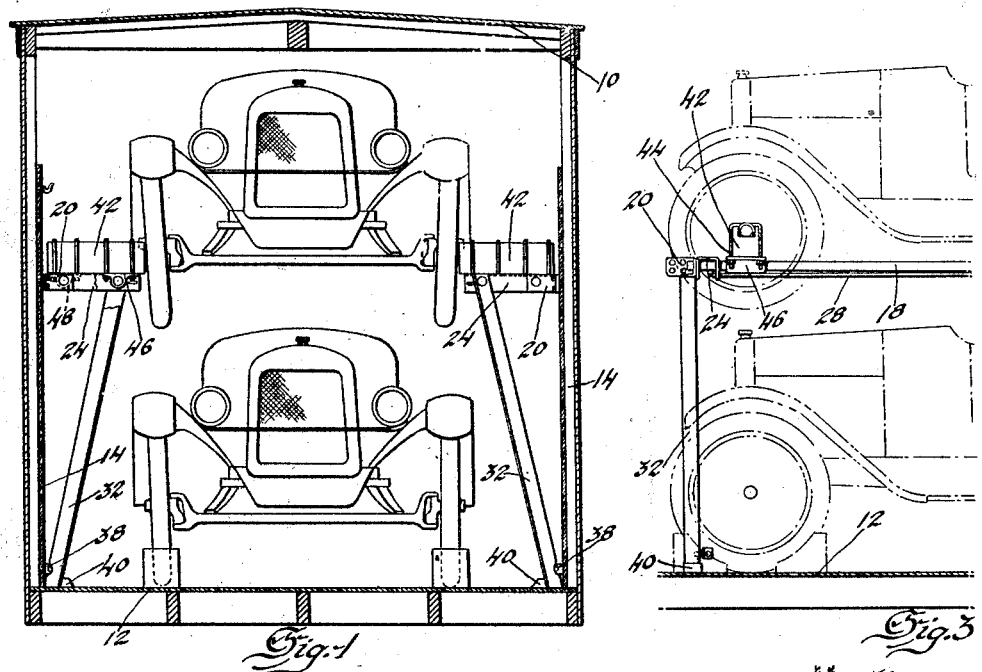
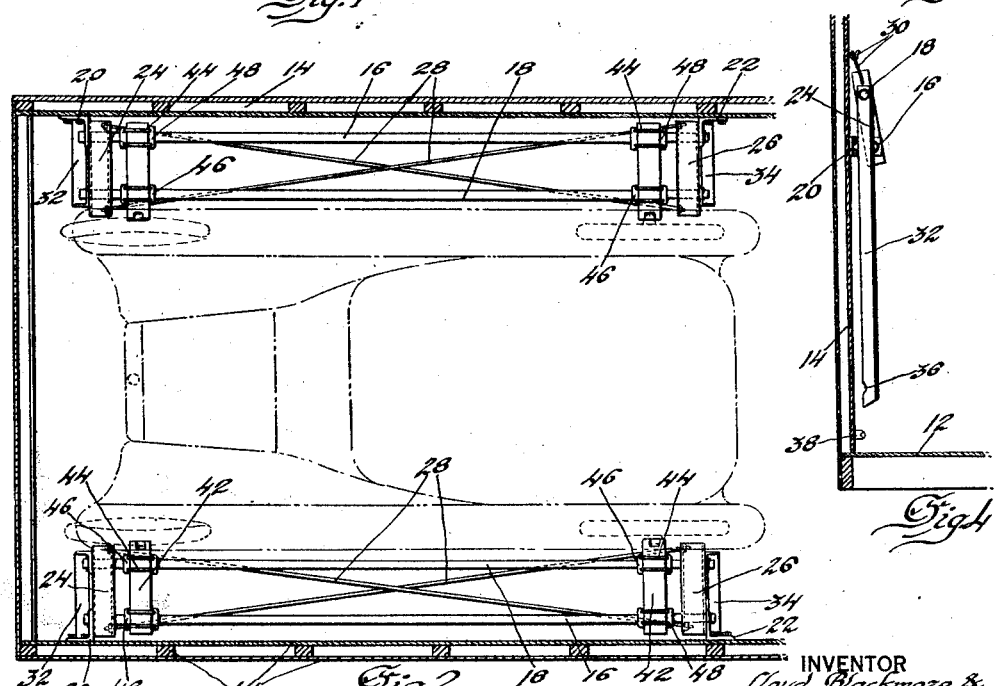
INVENTOR
Lloyd Blackmore &
Montgomery W. McConkey
BY
Blackmore, Spencer & Fluit
ATTORNEYS Jan. 3, 1928.
L. BLACKMORE ET AL
1,655,129
AUTOMOBILE SHIPPING DEVICE
Filed June 13, 1924     2 Sheets-Sheet 2
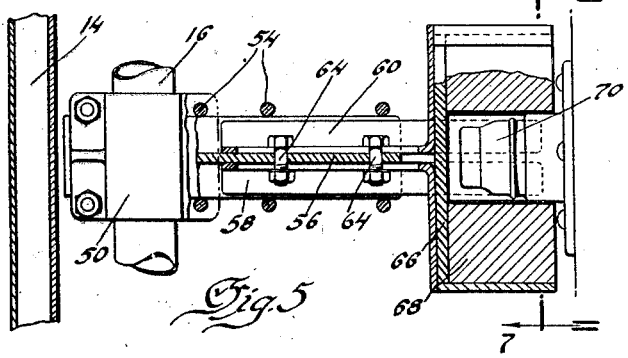
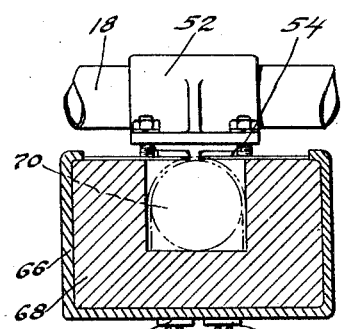
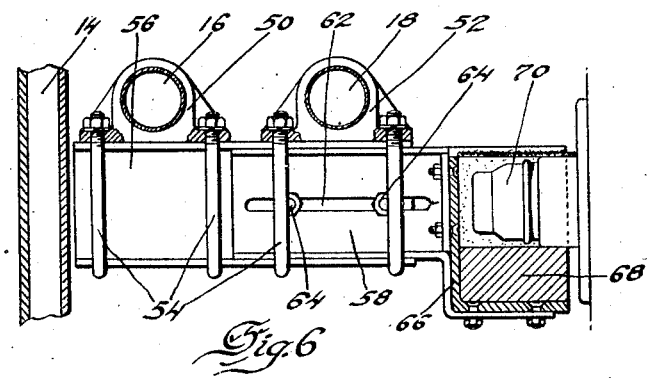
INVENTOR
Lloyd Blackmore &
Montgomery W. McConkey
BY
ATTORNEYS Patented Jan. 3, 1928.

1,655,129

UNITED STATES PATENT OFFICE.

LLOYD BLACKMORE, OF HIGHLAND PARK, AND MONTGOMERY W. McCONKEY, OF FERNDALE, MICHIGAN, ASSIGNORS TO GENERAL MOTORS CORPORATION, OF DETROIT, MICHIGAN, A CORPORATION OF DELAWARE.

AUTOMOBILE SHIPPING DEVICE.

Application filed June 13, 1924. Serial No. 719,759.

This invention relates to the shipment of automobiles in freight cars, and is illustrated as embodied in several different modifications of structures for supporting or "decking" an upper automobile with clearance beneath for a second automobile on the floor.

An important object of the invention is to provide freight cars with permanent automobile-supporting structures or "decks", in lieu of the usual temporary wooden "decks" which must be replaced each time the cars are used, at a considerable cost and with more or less damage to the walls and floors by the driving and withdrawal of from 70 to 100 nails for each "deck". Preferably the permanent decks are arranged to be folded against the side walls of the freight car when not in use, and it is in practice very desirable that they be provided with hub or axle supports which are adjustable to carry automobiles of different wheel bases. While the invention relates primarily to permanent decks, we show in one modification a temporary wooden deck to illustrate the application to such decks of some of the principles of the invention.

The above and other objects and features of the invention, including various novel combinations and desirable particular constructions, will be apparent from the following description of the illustrative embodiments shown in the accompanying drawings, in which:

Figure 1 is a diagrammatic vertical section through a freight car, showing in end elevation a deck and an automobile supported by the deck;

Figure 2 is a horizontal section through the freight car just below the roof, showing the deck in top plan with the position of the automobile indicated in dotted lines.

Figure 3 is a side elevation of one end of the deck, looking outwardly from the center of the freight car, and with the position of the automobile indicated by dotted lines;

Figure 4 is an end view of the deck as folded when not in use;

Figure 5 is a view partly in top plan and partly in horizontal section of a longitudinally-adjustable hub support which can be used in lieu of those shown in Figures 1 and 2;

Figure 6 is a view, partly in side elevation and partly in vertical section, of the hub support of Figure 5;

Figure 7 is an end elevation of the hub support of Figures 5 and 6, with the position of the hub indicated in dotted lines.

In the arrangement shown in Figures 1–4, the deck is permanently installed in a freight car having a roof 10, a floor 12, and side walls 14. The deck comprises a supporting framework including a longitudinally-extending pair of metal tubes or rods 16 and 18 adjacent each side wall 14, tube 16 being rigidly secured in two brackets 20 and 22 fastened to the side wall. Tube 18 is carried by a pair of arms 24 and 26, each arm being a channel iron with its opposite flanges secured at one end to tube 18, which passes through openings in the flanges, and with the flanges at their opposite ends having openings sleeved on the tube 16. The arms 24 and 26 are braced by diagonal tension rods 28. Arms 24 and 26, with tube 18 and rods 28, swing upwardly against the side wall 14 about the rod 16 as an axis when not in use (Figure 4), and may be secured in any desired manner, as by interengaging hooks 30. When in use, the weight of the automobile is taken by legs 32 and 34 of angle iron, pivoted on opposite ends of tube 18 outside of the arms 24 and 26, and fastened down by notches 36 engaging projections 38 on wall 14 and held by blocks 40 nailed to floor 12.

In order to hold automobiles of different wheel bases, hub supports in the form of wooden arms or blocks 42 are provided, each being notched at its outer end to receive one of the hubs, the hub being secured in the notch in any desired manner, as by a metal strap (not shown) encircling the top of the hub and nailed to the arm 42. The arms 42 are intended to be used once and then discarded, and are cut to provide for the proper size of hub and to allow for the proper distance between the ends of opposite hubs. Each arm 42 is secured by four U-bolts 44 to two saddles 46 and 48 sleeved respectively on tubes 16 and 18. Set screws or the like (not shown) may be provided for fastening the saddles to the tubes in adjusted position.

Instead of the wooden arms 42, the arms shown in Figures 5, 6, and 7 may be provided. Each of these arms comprises a pair of saddles 50 and 52 sleeved respectively on tubes 16 and 18, and secured by U-bolts 54 to an I-beam 56. A pair of channel irons 58 and 60, slotted at 62, are adjustably secured to opposite sides of the I-beam by bolts 64, to allow a limited adjustment to fit automobiles of different widths between the outer ends of opposite hubs. The channel irons 58 and 60 carry an open-ended supporting case 66 for a wood block 68 recessed for the hub 70, which can be secured therein by a metal strap, not shown, or in any other desired manner. The use of wood blocks 68 provides for hubs of different sizes and shapes, as interchangeable blocks are readily provided and one set may be discarded when different blocks are to be substituted.

While several illustrative embodiments have been described in detail, it is not our intention to limit the scope of the invention to those particular embodiments, or otherwise than by the terms of the appended claims.

We claim:

1. A freight car comprising, in combination, side walls and a floor, supporting legs extending upwardly from the floor, and longitudinally-extending automobile-supporting members secured to and resting on said legs, the legs and said members being foldable against the side walls when not in use.

2. A freight car comprising, in combination, side walls, a pair of supporting members adjacent each wall, one extending along the wall and the other substantially parallel thereto and spaced inwardly of the car, and automobile hub-supporting arms secured to each pair of supporting members.

3. A freight car comprising, in combination, side walls, a pair of supporting members adjacent each wall, one extending along the wall and the other substantially parallel thereto and spaced inwardly of the car, and automobile hub-supporting arms adjustable lengthwise of each pair of supporting members to carry automobiles of different wheel bases.

4. A freight car comprising, in combination, side walls, a pair of supporting members adjacent each wall, one extending along the wall and the other substantially parallel thereto and spaced inwardly of the car, crossed diagonal braces connecting each pair of supporting members, and automobile hub-supporting arms secured to each pair of supporting members.

5. A freight car comprising, in combination, four wood blocks recessed to receive the four hubs of an automobile, supports in opposite sides of the car, and means to secure the blocks to the supports and to permit adjustment of the blocks lengthwise of the car to hold automobiles of different wheel bases.

6. A freight car comprising, in combination, opposite side walls and a floor, a supporting bracket secured adjacent each of the side walls and projecting outwardly therefrom, hub carriers, and means for slidably and adjustably mounting the hub carriers on the brackets permitting adjustment of the carriers longitudinally of the car to support by the hubs off the floor automobiles of different wheel bases.

In testimony whereof we affix our signatures.

LLOYD BLACKMORE.
MONTGOMERY W. McCONKEY.